United States Patent
Sueishi

(10) Patent No.: US 11,124,029 B2
(45) Date of Patent: Sep. 21, 2021

(54) TWO-WHEELED VEHICLE TIRE

(71) Applicant: Sumitomo Rubber Industries, Ltd., Hyogo (JP)

(72) Inventor: Makoto Sueishi, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 410 days.

(21) Appl. No.: 16/243,213

(22) Filed: Jan. 9, 2019

(65) Prior Publication Data

US 2019/0241026 A1    Aug. 8, 2019

(30) Foreign Application Priority Data

Feb. 6, 2018  (JP) .............................. JP2018-019511

(51) Int. Cl.
  *B60C 11/11* (2006.01)
  *B60C 15/06* (2006.01)
  *B60C 11/00* (2006.01)

(52) U.S. Cl.
  CPC ...... *B60C 15/0603* (2013.01); *B60C 11/0008* (2013.01); *B60C 11/11* (2013.01); *B60C 15/0607* (2013.01); *B60C 2011/0016* (2013.01); *B60C 2015/061* (2013.01); *B60C 2200/10* (2013.01); *B60C 2200/14* (2013.01)

(58) Field of Classification Search
  None
  See application file for complete search history.

(56) References Cited

U.S. PATENT DOCUMENTS

| | | | |
|---|---|---|---|
| 4,085,787 A | | 4/1978 | Maiocchi |
| 2004/0055689 A1 | * | 3/2004 | Suzuki ................ B60C 15/0607 |
| | | | 152/552 |
| 2012/0325390 A1 | * | 12/2012 | Bourgeois ........... B60C 15/0628 |
| | | | 152/541 |

(Continued)

FOREIGN PATENT DOCUMENTS

| | | | |
|---|---|---|---|
| JP | 2007-290443 A | | 11/2007 |
| JP | 2007326520 | * | 12/2007 ............. B60C 11/00 |

(Continued)

OTHER PUBLICATIONS

JP2007326520 Matsumura English Translation (Year: 2007).*

(Continued)

*Primary Examiner* — Jacob T Minskey
*Assistant Examiner* — Adrien J Bernard
(74) *Attorney, Agent, or Firm* — Studebaker & Brackett PC

(57) ABSTRACT

A two-wheeled vehicle tire includes a carcass extending between bead cores each disposed in a respective one of bead portions through a tread portion and sidewall portions, the carcass including at least one carcass ply having a ply main portion extending between the bead cores through the tread portion, and a bead apex rubber extending radially outwardly from each bead core. The bead apex rubber includes a first rubber portion arranged adjacent to the ply main portion, and a second rubber portion arranged axially outwardly of the first rubber portion, the first rubber portion has a first end positioning radially outermost thereof, the second rubber portion has a second end positioning radially outermost thereof, and the first end is located radially outwardly of the second end.

20 Claims, 2 Drawing Sheets

(56) References Cited

U.S. PATENT DOCUMENTS

2013/0167993 A1* 7/2013 Otani .................. B60C 11/005
152/209.1

FOREIGN PATENT DOCUMENTS

| JP | 2015-160480 A | 9/2015 |
| JP | 2017-136876 A | 8/2017 |
| WO | 02/096676 A1 | 12/2002 |

OTHER PUBLICATIONS

Extended European Search Report issued by the European Patent Office dated May 3, 2019, which corresponds to EP19150876.1-1012 and is related to U.S. Appl. No. 16/243,213.

* cited by examiner

TWO-WHEELED VEHICLE TIRE

BACKGROUND ART

Field of the Disclosure

The present disclosure relates to tires, and more particularly to a two-wheeled vehicle tire capable of improving cornering performance and impact absorbing performance.

Description of the Related Art

Conventionally, various kinds of two-wheeled vehicle tires which are suitable for traveling in rough terrain have been proposed. For example, the following Patent document 1 discloses a two-wheeled vehicle tire which includes a pair of bead apex rubbers extending radially outwardly from bead cores to base portions of shoulder blocks.

PATENT DOCUMENT

Patent Document 1

Japanese Unexamined Patent Application Publication 2017-136876

SUMMARY OF THE DISCLOSURE

Unfortunately, the tire disclosed in Patent document 1, when used for severe traveling conditions such as off-road bike competitions, was not able to exert satisfactory performance on jumping or cornering.

In view of the above problems in the conventional art, the present disclosure has an object to provide a two-wheeled vehicle tire capable of improving cornering performance and impact absorbing performance in a high level.

According to one aspect of the disclosure, a two-wheeled vehicle tire includes a carcass extending between bead cores each disposed in a respective one of bead portions through a tread portion and sidewall portions, the carcass including at least one carcass ply having a ply main portion extending between the bead cores through the tread portion, and a bead apex rubber extending radially outwardly from each bead core. The bead apex rubber includes a first rubber portion arranged adjacent to the ply main portion, and a second rubber portion arranged axially outwardly of the first rubber portion, the first rubber portion has a first end positioning radially outermost thereof, the second rubber portion has a second end positioning radially outermost thereof, and the first end is located radially outwardly of the second end.

In another aspect of the disclosure, the first rubber portion may be different in hardness from the second rubber portion.

In another aspect of the disclosure, a hardness of the first rubber portion may be greater than a hardness of the second rubber portion.

In another aspect of the disclosure, the hardness of the first rubber portion may be equal to or more than 82 degrees.

In another aspect of the disclosure, the hardness of the second rubber portion may be equal to or less than 80 degrees.

In another aspect of the disclosure, a radial height of the second rubber portion from the bead core to the second end may be equal to or less than 25% of a radial height of the first rubber portion from the bead core to the first end.

In another aspect of the disclosure, a substantially constant-thickness region of the first rubber portion in which a difference between a maximum thickness and a minimum thickness is equal to or less than 20% of the minimum thickness may have a length equal to or more than 80% of a radial height of the first rubber portion from the bead core to the first end.

In another aspect of the disclosure, the tread portion may further include a row of shoulder blocks arranged in a tire circumferential direction to define a tread edge, each shoulder block connected to one of the sidewall portions at a boundary location, and the first end being located radially outwardly of the boundary location.

In another aspect of the disclosure, the first end may be located within a shoulder-block-contact-surface projected region in which a ground contact surface of one of the shoulder blocks is projected onto the ply main portion in a normal direction of the ground contact surface of one of the shoulder blocks.

In another aspect of the disclosure, the shoulder blocks may be made of a rubber having a hardness ranging from 50 to 85 degrees.

DESCRIPTION OF THE PREFERRED EMBODIMENTS

An embodiment of the present disclosure will be explained below with reference to the accompanying drawings.

Figure 1:
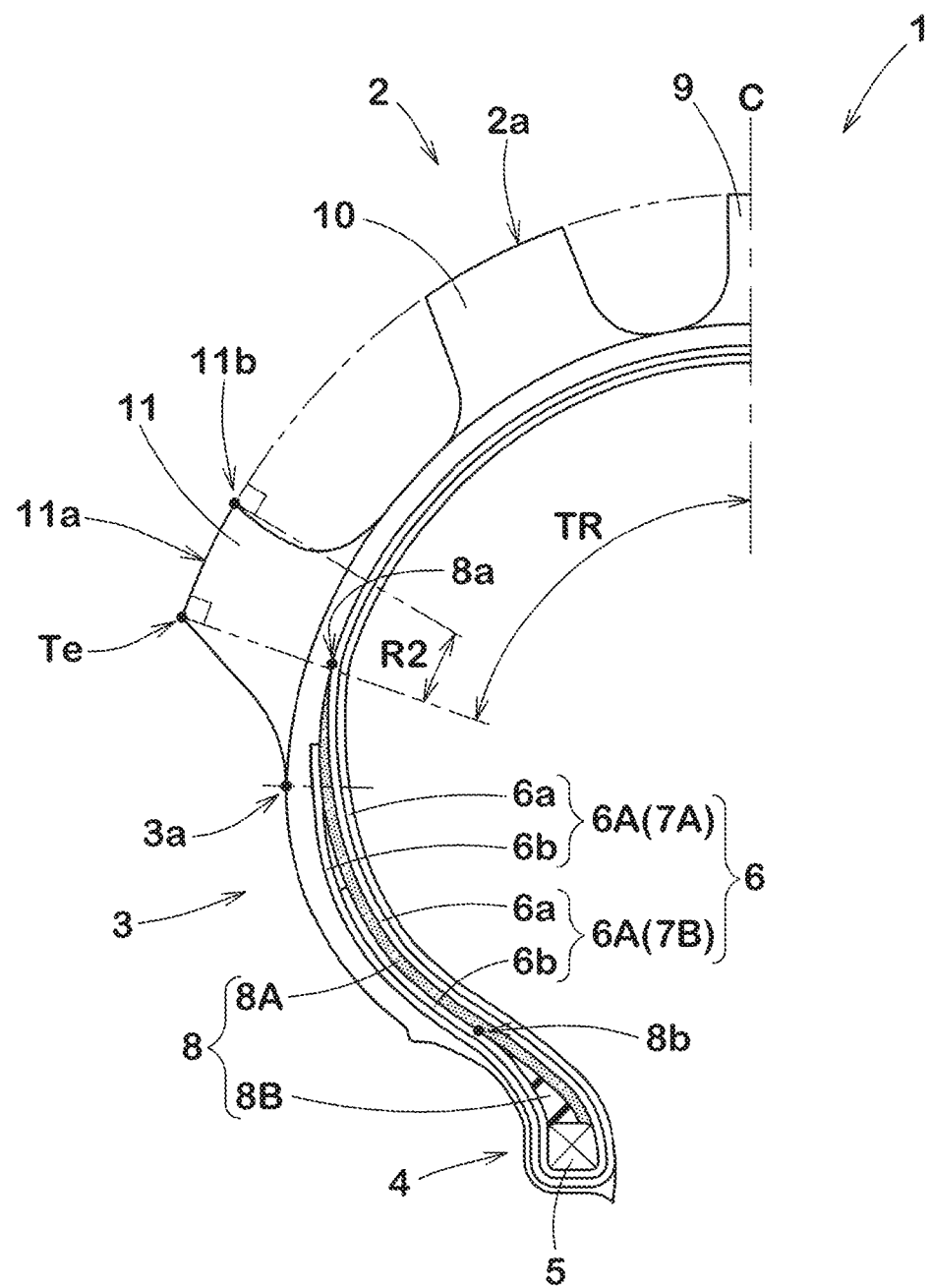
FIG. 1 illustrates a cross-sectional view of a two-wheeled vehicle tire in accordance with an embodiment of the disclosure.

FIG. 1 illustrates a cross-sectional view of a two-wheeled vehicle tire (hereinafter, simply referred to as "tire") 1 in accordance with an embodiment of the disclosure, wherein the tire is placed under a standard condition.

The tire 1, for example, is suitable for traveling on rough terrain, e.g., off-road bike competitions.

As used herein, the standard condition is such that the tire 1 is mounted on a standard wheel rim (not illustrated) and inflated to a standard pressure but loaded with no tire load. In this application including specification and claims, various dimensions, positions and the like of the tire 1 refer to those under the standard condition of the tire 1 unless otherwise noted.

The standard wheel rim is a wheel rim officially approved or recommended for the tire 1 by standards organizations, wherein the standard wheel rim is the "standard rim" specified in JATMA, the "Measuring Rim" in ETRTO, and the "Design Rim" in IRA or the like, for example.

The standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As illustrated in FIG. 1, the tire 1 according to the embodiment includes a carcass 6 extending between axially spaced bead cores 5 each disposed in a respective one of bead portions 4 through a tread portion 2 and sidewall portions 3, and a bead apex rubber 8 extending radially outwardly from each bead core 5. Note that in FIG. 1 the right half portion of the tire 1 is omitted since it has a substantially symmetrical structure as the left half portion.

The carcass 6 includes at least one, preferably two carcass plies 6A of cords as this embodiment. Preferably, the carcass 6 is configured as a bias structure. Alternately, the carcass 6 may be configured as a radial structure. In this embodiment, the carcass plies 6A, for example, include radially inner ply 7A and a radially outer ply 7B.

At least one of the carcass plies 6A has a ply main portion 6a extending between the bead cores 5 through the tread portion 2 and the sidewall portions 3 and a pair of ply turn-up portions 6b each turned up around a respective one of the bead cores 5. In this embodiment, each of two carcass plies 6A includes the ply main portion 6a and the pair of ply turn-up portion 6b.

In each bead portion 4, the bead apex rubber 8 is preferably disposed between the ply main portion 6a and the ply turn-up portion 6b. The bead apex rubber 8 according to the embodiment includes a first rubber portion 8A arranged adjacent to the ply main portion 6a, and a second rubber portion 8B arranged axially outwardly of the first rubber portion 8A. In such a bead apex rubber 8, a rigidity distribution can be controlled easily such that cornering performance and impact absorbing performance of the tire 1 improve.

The first rubber portion 8A has a first end 8a positioning radially outermost thereof. The second rubber portion 8B has a second end 8b positioning radially outermost thereof. Preferably, the first end 8a is located radially outwardly of the second end 8b. Thus, the first rubber portion 8A may increase the rigidity of the sidewall portions 3 uniformly, resulting in deforming substantially uniform strain over the sidewall portions 3 even upon receiving a large tire load. As a result, the tire 1 can improve cornering performance by the enhanced rigidity of sidewall portions 3 as well as impact absorbing performance by offering a uniformed rigidity over the sidewall portions 3.

In some preferred embodiments, the first end 8a of the first rubber portion 8A is preferably located radially outwardly of the radially outer end of the ply turn-up portion 6b of the carcass ply 6A to enhance the rigidity of the entire sidewall portions 3.

The first rubber portion 8A is different in hardness from the second rubber portion 8B. This aspect makes controlling a rigidity distribution of the sidewall portions 3 easy, thus improving cornering performance and impact absorbing performance of the tire 1.

In this embodiment, a hardness of the first rubber portion 8A is greater than a hardness of the second rubber portion 8B. Such a first rubber portion 8A may be useful to improve rigidity of the sidewall portions 3 uniformly so that cornering performance and impact absorbing performance of the tire 1 can be improved.

Preferably, the first rubber portion 8A has a hardness equal to or more than 82 degrees. When the hardness of first rubber portion 8A is less than 82 degrees, the effect that improves rigidity of the sidewall portions 3 may be restricted. As used herein, a hardness of rubber shall mean the durometer type-A hardness measured according to Japanese Industrial Standard JIS-K6253 at a temperature of 23 degrees C.

The second rubber portion 8B has a hardness equal to or less than 80 degrees. When the hardness of second rubber portion 8B exceeds 80 degrees, the rigidity of the sidewall portions 3 may be non-uniform.

Figure 2:
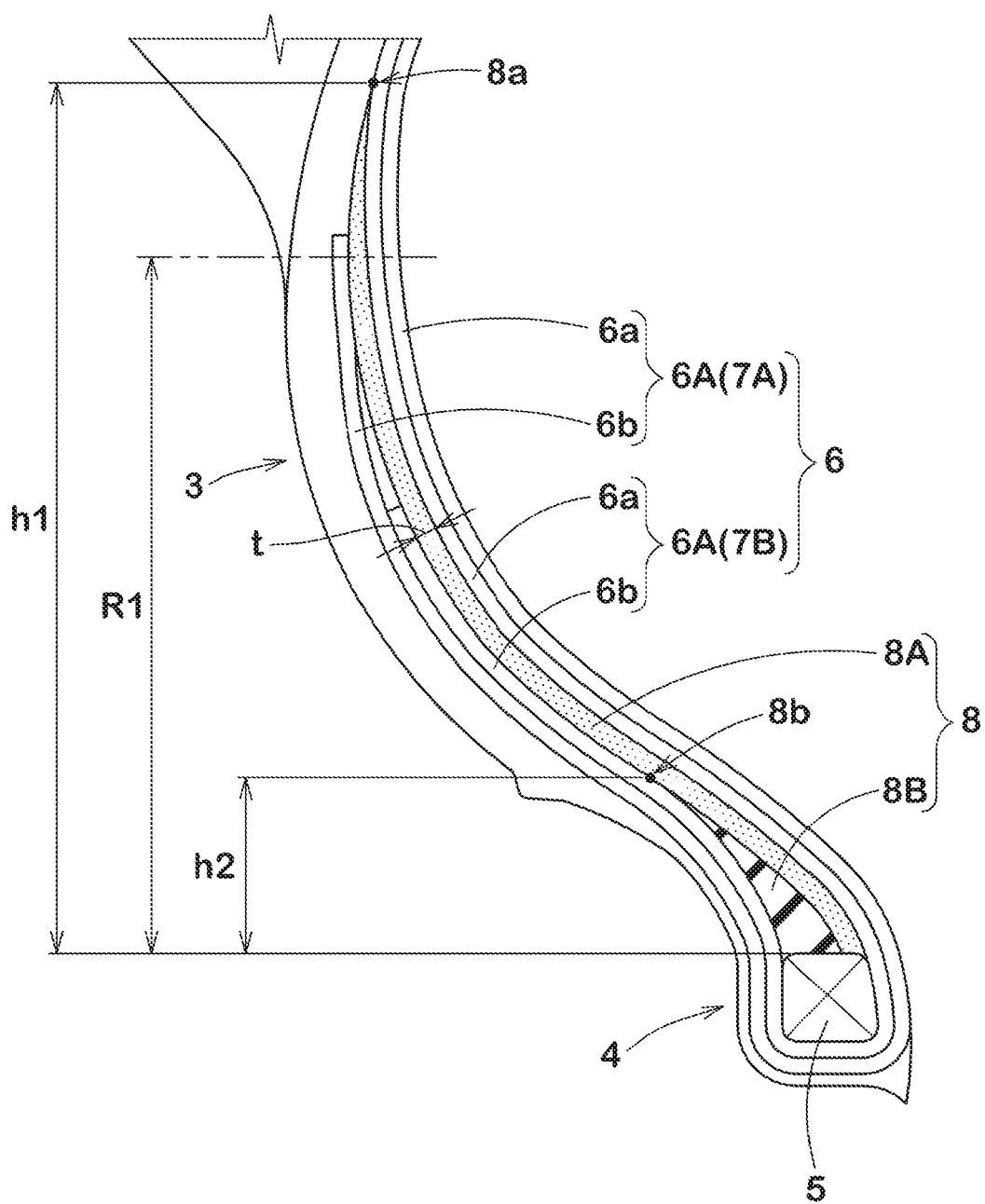
FIG. 2 is an enlarged cross-sectional view of a bead portion.

FIG. 2 illustrates an enlarged cross-sectional view of one of the bead portions 4. As illustrated in FIG. 2, a radial height h2 of the second rubber portion 8B from the bead core 5 to the second end 8b is equal to or less than 25% of a radial height h1 of the first rubber portion 8A from the bead core 5 to the first end 8a. When the height h2 is more than 25% of the height h1, the effect that improves impact absorbing performance may be restricted since the rigidity of sidewall portions 3 may increase locally. In view of the above, the height h2 is preferably lower than a rim flange height of the rim (not illustrated) onto which the tire is mounted.

Preferably, the first rubber portion 8A has a substantially constant-thickness region R1, and the region R1 occupies in radial length equal to or more than 80%, more preferably equal to or more than 85% of the height h1 of the first rubber portion 8A. As used herein, the substantially constant-thickness region R1 is a region where a substantially constant thickness t continues such that a difference between a maximum thickness t1 (not illustrated) and a minimum thickness t2 (not illustrated) is equal to or less than 20% of the minimum thickness t2 (not illustrated). In this embodiment, the region R1 extends radially outwardly from the bead core 5, for example. Thus, such a first rubber portion 8A may increase the rigidity of the sidewall portions 3 uniformly, improving both cornering performance and impact absorbing performance of the tire 1 in a high level.

As illustrated in FIG. 1, the tread portion 2 according to the embodiment includes rows of circumferentially arranged crown blocks 9, middle blocks 10, and shoulder blocks 11. Preferably, the tread portion 2 has a land ratio ranging from 14% to 35%. Such a tread portion 2 may be suitable for traveling on rough terrain, e.g., off-road bike competitions.

As used herein, the land ratio means a ratio Sb/S of the sum total Sb of the ground contact surface areas of the crown blocks 9, the middle blocks 10 and the shoulder blocks 11 to the gross contact area S of the tread portion 2. The gross contact area S of the tread portion 2 is calculated by summing the sum total Sb and the sum total of groove areas.

The crown blocks 9, for example, are arranged on the tire equator C. The shoulder blocks 11 according to the embodiment are arranged in the tire circumferential direction to define the tread edge Te on each side of the tire equator C. Each shoulder block 11 is connected to one of the sidewall portions 3 at a boundary location 3a. The middle blocks 10 are arranged in the tire circumferential direction between the rows of the crown blocks 9 and the shoulder blocks 11 on each side of the tire equator C.

The tread edge Te means an edge of an axially outermost ground contact surface 2a of the tread portion 2 on each side of the tire equator C. In this embodiment, the tread edge Te is defined by the ground contact surfaces 11a of the shoulder blocks 11. The tire equator C corresponds to the center between axially spaced tread edges Te in the tire axial direction.

Preferably, the crown blocks 9, the middle blocks 10 and the shoulder blocks 11 are made of a rubber having a hardness ranging from 50 to 85 degrees to provide better driving performance on off-road. The crown blocks 9, the middle blocks 10 and the shoulder blocks 11 may have the same hardness as with each other, alternatively may have different harnesses from one another.

In this embodiment, the first end 8a of the first rubber portion 8A is located radially outwardly of the boundary location 3a. Employing such a first rubber portion 8A, the rigidity of the sidewall portion 3 can be enhanced uniformly to improve both cornering performance and impact absorbing performance of the tire 1.

Preferably, the first end 8a is located within a shoulder-block-contact-surface projected region R2 in which a ground contact surface 11a of one of the shoulder blocks 11 is projected onto the ply main portion 6a in a normal direction of the ground contact surface 11a of one of the shoulder blocks 11. In this aspect, the rigidity of the sidewall portions 3 can be enhanced uniformly further, thereby improving both cornering performance and impact absorbing performance of the tire 1 in a high level.

Here, the shoulder-block-contact-surface projected region R2 is a region between a location where the tread edge Te is projected onto the ply main portion 6a and a location where a shoulder inner end 11b of the ground contact surface 11a is projected onto the ply main portion 6a.

Preferably, the shoulder-block-contact-surface projected region R2 occupies a region ranging from 10% to 20% of a tread region TR, more preferably ranging from 14% to 16%. As used herein, the tread region TR is defined as a region between a location where the tire equator C is projected onto the ply main portion 6a and a location where the tread edge Te is projected onto the ply main portion 6a.

an index where Ref. 1 is set to 100. The larger value indicates better the impact absorbing performance with low load.

Impact Absorbing Performance Test with High Load:

The test rider drove the motorcycle equipped with each test tire in order on a rough terrain test course having a jumping section and evaluated the impact absorbing performance upon landing after jumps by the rider's sense. The test results are indicated in Table 1 using an index where Ref. 1 is set to 100. The larger value indicates better the impact absorbing performance with high load.

Cornering Performance Test:

The test rider drove the motorcycle equipped with each test tire in order on a rough terrain test course having a cornering section and evaluated the cornering performance with traction by the rider's sense. The test results are indicated in Table 1 using an index where Ref. 1 is set to 100. The larger value indicates better the cornering performance.

Table 1 shows the test results.

TABLE 1

| | Ref. 1 | Ref. 2 | Ex. 1 | Ex. 2 | Ex. 3 | Ex. 4 |
|---|---|---|---|---|---|---|
| Second rubber portion in bead apex rubbers | none | applied | applied | applied | applied | applied |
| Relationship between heights h1 and h2 | — | h1 < h2 | h1 > h2 | h1 > h2 | h > h2 | h1 > h2 |
| First end location in shoulder-block-contact-surface projected region R2 | Yes | Yes | Yes | Yes | Yes | Yes |
| Substantially constant-thickness region of first rubber portion length/height h1 (%) | 60 | 85 | 85 | 85 | 60 | 85 |
| First rubber portion hardness (deg.) | 85 | 85 | 85 | 85 | 85 | 75 |
| Second rubber portion hardness (deg.) | — | 75 | 75 | 75 | 75 | 85 |
| Impact absorbing performance at low load (index) | 100 | 125 | 120 | 110 | 105 | 103 |
| Impact absorbing performance at high load (index) | 100 | 90 | 100 | 100 | 100 | 100 |
| Cornering performance (index) | 100 | 90 | 110 | 110 | 103 | 110 |

While the particularly preferable embodiments in accordance with the present disclosure have been described in detail, the present disclosure is not limited to the illustrated embodiments, but can be modified and carried out in various aspects.

EXAMPLE

Bias tires for off-road bike having a basic structure as shown in FIG. 1 were prototyped based on the specification in Table 1. As a comparative example tire (Ref. 1), a tire for off-road bike having a pair of bead apex rubbers which are made of one kind of rubber was prototyped. Then, each test tire was installed to a motorcycle as a rear wheel to test.

The common specification and the testing methods for the test tires are as follows:

test vehicle: a motorcycle having a displacement of 450 cc;

tire size: 120/90-19;

rim size: 2.15×19; and inner pressure: 80 kPa.

Impact Absorbing Performance Test with Low Load:

A test rider drove the motorcycle equipped with each test tire in order on a rough terrain test course having a section with continuous small bumps and evaluated the impact absorbing performance upon landing on the bumps by the rider's sense. The test results are indicated in Table 1 using From the test results, it is confirmed that the example tires, compared with the comparative examples, improve the respective performance in a well-balanced manner to compatible the cornering performance with the impact absorbing performance.

What is claimed is:

1. A two-wheeled vehicle tire comprising:
    a carcass extending between bead cores each disposed in a respective one of bead portions through a tread portion and sidewall portions, the carcass comprising at least one carcass ply having a ply main portion extending between the bead cores through the tread portion; and
    a bead apex rubber extending radially outwardly from each bead core, wherein
    the bead apex rubber comprises a first rubber portion arranged adjacent to the ply main portion, and a second rubber portion arranged axially outwardly of the first rubber portion,
    the first rubber portion is different in hardness from the second rubber portion,
    an entire length of an axially inner surface of the second rubber portion is in direct contact with an axially outer surface of the first rubber portion,
    the first rubber portion has a first end positioning radially outermost thereof,
    the second rubber portion has a second end positioning radially outermost thereof, and the first end is located radially outwardly of the second end.

2. The two-wheeled vehicle tire according to claim 1, wherein
a hardness of the first rubber portion is greater than a hardness of the second rubber portion.

3. The two-wheeled vehicle tire according to claim 2, wherein
the hardness of the first rubber portion is equal to or more than 82 degrees.

4. The two-wheeled vehicle tire according to claim 2, wherein
the hardness of the second rubber portion is equal to or less than 80 degrees.

5. The two-wheeled vehicle tire according to claim 1, wherein
a radial height of the second rubber portion from the bead core to the second end is equal to or less than 25% of a radial height of the first rubber portion from the bead core to the first end.

6. The two-wheeled vehicle tire according to claim 1, wherein
a substantially constant-thickness region of the first rubber portion in which a difference between a maximum thickness and a minimum thickness is equal to or less than 20% of the minimum thickness has a length equal to or more than 80% of a radial height of the first rubber portion from the bead core to the first end.

7. The two-wheeled vehicle tire according to claim 1,
the tread portion further comprising a row of shoulder blocks arranged in a tire circumferential direction to define a tread edge, each shoulder block connected to one of the sidewall portions at a boundary location, and
the first end being located radially outwardly of the boundary location.

8. The two-wheeled vehicle tire according to claim 7, wherein
the first end is located within a shoulder-block-contact-surface projected region in which a ground contact surface of one of the shoulder blocks is projected onto the ply main portion in a normal direction of the ground contact surface of one of the shoulder blocks.

9. The two-wheeled vehicle tire according to claim 7, wherein
the shoulder blocks are made of a rubber having a hardness ranging from 50 to 85 degrees.

10. The two-wheeled vehicle tire according to claim 3, wherein
the hardness of the second rubber portion is equal to or less than 80 degrees.

11. The two-wheeled vehicle tire according to claim 1, wherein
a radial height of the second rubber portion from the bead core to the second end is equal to or less than 25% of a radial height of the first rubber portion from the bead core to the first end.

12. The two-wheeled vehicle tire according to claim 2, wherein
a radial height of the second rubber portion from the bead core to the second end is equal to or less than 25% of a radial height of the first rubber portion from the bead core to the first end.

13. The two-wheeled vehicle tire according to claim 3, wherein
a radial height of the second rubber portion from the bead core to the second end is equal to or less than 25% of a radial height of the first rubber portion from the bead core to the first end.

14. The two-wheeled vehicle tire according to claim 4, wherein
a radial height of the second rubber portion from the bead core to the second end is equal to or less than 25% of a radial height of the first rubber portion from the bead core to the first end.

15. The two-wheeled vehicle tire according to claim 1, wherein
a substantially constant-thickness region of the first rubber portion in which a difference between a maximum thickness and a minimum thickness is equal to or less than 20% of the minimum thickness has a length equal to or more than 80% of a radial height of the first rubber portion from the bead core to the first end.

16. The two-wheeled vehicle tire according to claim 2, wherein
a substantially constant-thickness region of the first rubber portion in which a difference between a maximum thickness and a minimum thickness is equal to or less than 20% of the minimum thickness has a length equal to or more than 80% of a radial height of the first rubber portion from the bead core to the first end.

17. The two-wheeled vehicle tire according to claim 1, wherein
the at least one carcass ply further comprising a pair ply turn-up portion each turned up around a respective one of the bead cores and extending radially outwardly, and
an axially outer surface of the second rubber portion, in each bead portion, is in direct contact with an axially inner surface of the ply turn-up portion.

18. The two-wheeled vehicle tire according to claim 1, wherein
the at least one carcass ply further comprises a pair ply turn-up portion each turned up around a respective one of the bead cores and extending radially outwardly to an outermost end thereof, and
the first end, in each bead portion, is located radially outwardly of the outermost end of the ply turn-up portion.

19. The two-wheeled vehicle tire according to claim 18, wherein
the tread portion further comprises a row of shoulder blocks arranged in a tire circumferential direction to define a tread edge, each shoulder block connected to one of the sidewall portions at a boundary location,
the first end is located radially outwardly of the boundary location, and
the outermost end of the ply turn-up portion is located radially outwardly of the boundary location.

20. The two-wheeled vehicle tire according to claim 1, wherein
the first rubber portion has a thickness in an axial direction measured at an upper surface of the bead core is smaller than a thickness in the tire axial direction of the second rubber portion measured at the upper surface of the bead core.

* * * * *